United States Patent [19]
Barski et al.

[11] Patent Number: 5,212,741
[45] Date of Patent: May 18, 1993

[54] PREPROCESSING OF DOT-MATRIX/INK-JET PRINTED TEXT FOR OPTICAL CHARACTER RECOGNITION

[75] Inventors: Lori L. Barski; Roger S. Gaborski, both of Pittsford, N.Y.

[73] Assignee: Eastman Kodak Company, Rochester, N.Y.

[21] Appl. No.: 822,818

[22] Filed: Jan. 21, 1992

[51] Int. Cl.$^5$ .............................................. G06K 9/38
[52] U.S. Cl. ....................................... 382/51; 382/18; 382/54
[58] Field of Search ............................ 382/18, 51, 54; 358/455, 447, 445

[56] References Cited

U.S. PATENT DOCUMENTS

| | | | |
|---|---|---|---|
| H461 | 9/1989 | Weideman | 382/11 |
| 3,196,398 | 7/1965 | Baskin | 382/55 |
| 3,289,163 | 11/1966 | Jurk et al. | 382/54 |
| 3,737,855 | 6/1973 | Cutaia | 382/54 |
| 4,074,231 | 2/1978 | Yajima et al. | 382/54 |
| 4,263,504 | 4/1981 | Thomas | 235/454 |
| 4,365,304 | 12/1982 | Ruhman et al. | 364/515 |
| 4,646,355 | 2/1987 | Petrick et al. | 382/54 |
| 4,691,366 | 9/1987 | Fenster et al. | 382/54 |
| 4,791,679 | 12/1988 | Borski et al. | 382/55 |
| 4,953,114 | 8/1990 | Sato | 382/50 |

OTHER PUBLICATIONS

Jam, "Fundamentals of Digital Image Processing", 1990, pp. 235, and 244–245.
Baxes, "Digital Image Processing—A Practical Primer" 1989, pp. 52–56.

Primary Examiner—Leo H. Boudreau
Assistant Examiner—Christopher Kelley
Attorney, Agent, or Firm—Edward Dugas

[57] ABSTRACT

Method and apparatus are disclosed for processing image data of dot-matrix/ink-jet printed text to perform Optical Character Recognition (OCR) of such image data. In the method and apparatus, the image data is viewed for detecting if dot-matrix/ink-jet printed text is present. Any detected dot-matrix/ink-jet produced text is then pre-processed by determining the image characteristic thereof by forming a histogram of pixel density values in the image data. A 2-D spatial averaging operation as a second pre-processing step smooths the dots of the characters into strokes and reduces the dynamic range of the image data. The resultant spatially averaged image data is then contrast stretched in a third pre-processing step to darken dark regions of the image data and lighten light regions of the image data. Edge enhancement is then applied to the contrast stretched image data in a fourth pre-processing step to bring out higher frequency line details. The edge enhanced image data is then binarized and applied to a dot-matrix/ink jet neural network classifier for recognizing characters in the binarized image data from a predetermined set of symbols prior to OCR.

12 Claims, 5 Drawing Sheets

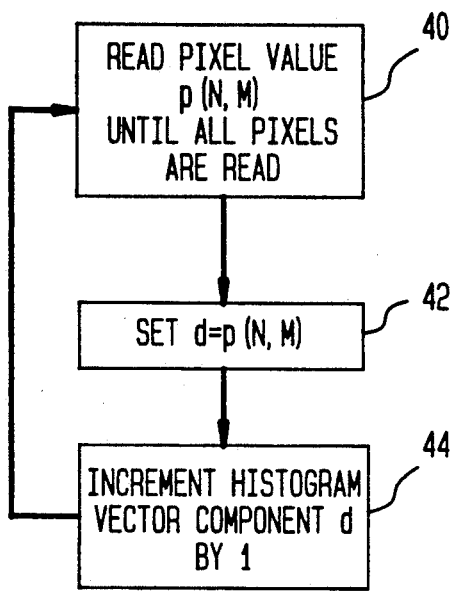
FIG. 2
FIG. 3
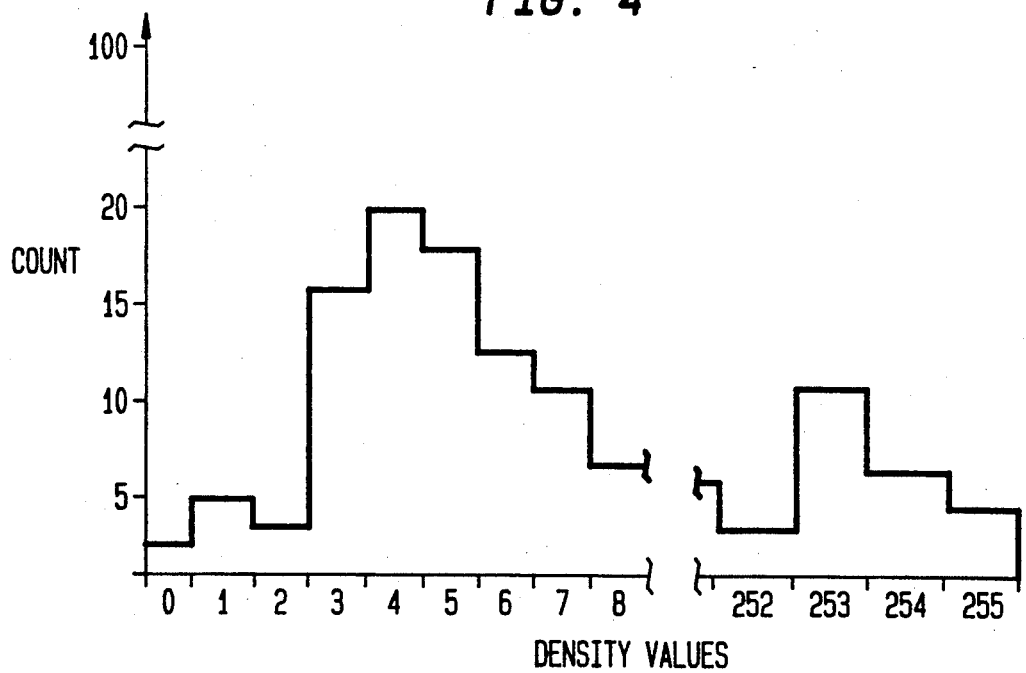
FIG. 4

1/25

$X1 \approx Xp + dX$
$X2 =$ HIGHEST NON-ZERO BIN IN HISTOGRAM $v = 0$, $0 \leq u \leq X1$
$v = m(u - X1)$, $X1 \leq u \leq X2$
$v = 0$, $X2 \leq u \leq 255$

PREPROCESSING OF DOT-MATRIX/INK-JET PRINTED TEXT FOR OPTICAL CHARACTER RECOGNITION

FIELD OF THE INVENTION

The present invention relates to method and apparatus for the preprocessing of grey-level data, prior to binarization, for improving optical character recognition (OCR) of dot-matrix or ink-jet generated printed matter.

BACKGROUND OF THE INVENTION

Most commercial Optical Character Recognition (OCR) systems cannot successfully accommodate dot-matrix or ink-jet printed matter due to segmentation and recognition errors. It is difficult to accommodate segmentation in OCR systems because of the unconnected character structure of the dot-matrix and ink-jet printed matter which is formed from dots. Typical prior art segmentation algorithms look for white spaces between characters. In dot-matrix and ink-jet printed characters, the prior art segmentation algorithms cannot distinguish between dots making up the character structure and the spaces between the characters. Recognition errors, on the other hand, can be attributed to both poor segmentation and atypical character structures. For example, an "A" produced by a non-dot-matrix printer (e.g., a laser or daisy wheel printer) and an "A" from a dot-matrix printer look quite different. Thus, a separate "classifier" is needed to accommodate the dot-matrix/ink-jet printed matter.

In applications where many forms or documents are to be processed, OCR offers increased read rates and higher throughput than manual data entry. Unfortunately, OCR devices are only capable of processing a predetermined set of text characters. With the forms processing industry accepting forms from many different sources, OCR devices must be capable of handling a variety of documents printed by many different printer devices. Currently, the OCR processing sites are forced to sort their documents by separating the documents into OCR-readable and non-OCR-readable text documents. Non-OCR-readable text documents include forms with, for example, handwritten text and text printed with a dot-matrix printer as well as ink-jet and bubble-jet printers. With the non-OCR-readable text documents, manual data entry is required because the read accuracy of this type of form in the OCR systems is very poor.

There are prior art techniques that examine binary image data and correct for discontinuities in the characters of the image. One such technique is disclosed in U.S. Pat. No. 4,791,679 (L. Barski et al.), issued on Dec. 13, 1988, which discloses a method for improving broken or weak characters of the binary image. More particularly, a character stroke is strengthened by processing the binary image data with a predetermined m-by-m kernel and moving the kernel one pixel at a time around the image. In each pixel position, the kernel, which is divided into m square sections, is selectively filled with black pixels in proportion to the number of black pixels in each section in accordance with a special set of rules.

U.S. Pat. No. 4,953,114 (H. Sato), issued on Aug. 28, 1990, discloses image signal processing apparatus. The apparatus comprises a line memory for storing lines of an image signal, an image content discriminator, a smoothing circuit, an edge emphasis circuit, and switching means. The image content discriminator comprises an amplitude detection circuit and a comparator connected in series. The amplitude detector detects an amplitude of the image signal in a vicinity of a frequency at which a visual obstacle will be generated. The output signal from the amplitude detection circuit is compared with a predetermined threshold to divide each pixel into areas depending on the dot image or the half-tone image. The smoothing circuit and the edge emphasis circuit are arranged in parallel and each receive the image signal from the line memory. The output from the comparator selects a position of the switching means to provide an output signal from either the smoothing circuit or the edge emphasis circuit depending on the result of the comparison.

U.S. Pat. No. 5,048,097 (R. Gaborski et al.), issued on Sep. 10, 1991, discloses an optical character recognition (OCR) neural network system for machine-printed characters. More particularly, character images sent to a neural network, which is trained to recognize a predetermined set of symbols, are first processed by an OCR pre-processor which normalizes the character images. The output of the neural network is processed by an OCR post-processor. The post-processor corrects erroneous symbol identifications made by the neural network. For characters identified by the neural network with low scores, the post-processor attempts to find and separate adjacent characters which are kerned, and characters which are touching. The touching characters are separated in one of nine successively initiated processes depending on the geometric parameters of the image. When all else fails, the post-processor selects either the second or third highest scoring symbol identified by the neural network based upon the likelihood of the second or third highest scoring symbol being confused with the highest scoring symbol.

It is desirable to provide an improved technique for pre-processing printed text generated with a dot-matrix print head as well as with an ink-jet printer for improving optical character recognition of such printed text.

SUMMARY OF THE INVENTION

The present invention is directed to method and apparatus for processing dot-matrix/ink-jet printed text for improving Optical Character Recognition (OCR) read rates of such printed text. More particularly, the method of processing image data of dot-matrix/ink-jet printed text for Optical Character Recognition (OCR) comprises the following steps. In a first step, the image characteristics of the dot-matrix/ink-jet image data are determined by forming a histogram of density values of pixels of the image data. In a second step, the dynamic range of the image data is reduced by altering the structure of characters in the image data from that of dots to one of strokes with a 2-D spatial averaging operation. In a third step, a contrast stretching operation is performed on the altered structure of the characters produced in the second step. In a fourth step, edge enhancement is performed on the image data produced in the third step. In a fifth step, the edge-enhanced image data produced in the fourth step is binarized. The binarized image data is then available to a neural network classifier for recognizing characters in the binarized image data from a predetermined set of symbols prior to OCR.

The apparatus of the present invention comprises means for pre-processing the image data of the dot-matrix or ink-jet printed text, and binarizing means. The means for pre-processing the image data comprises (a) means for determining the image characteristics of the dot-matrix/ink-jet image data, (b) 2-D spatial averaging means, (c) contrast stretching means, and (d) edge enhancement means. The means for determining the image characteristics of the dot-matrix/ink-jet image data functions to form a histogram of density values of pixels of the image data. The 2-D spatial averaging means functions to reduce the dynamic range of the image data by altering the structure of the characters in the image data from that of dots to one of strokes. The contrast stretching means performs a contrast stretching operation on the altered structure of the characters produced by the 2-D spatial averaging means. The edge enhancement means performs edge enhancement on the image data produced by the contrast stretching means. The binarizing means binarizes the edge-enhanced image data from the pre-processing means.

The invention and its various advantages will be better understood from the following more detailed description taken with the accompanying drawings and claims.

BRIEF DESCRIPTION OF THE DRAWINGS

FIG. 2 shows a flowchart of exemplary steps for producing a histogram of an image in a first pre-processing step of FIG. 1;

FIG. 3 shows a portion of an exemplary matrix of pixels of an image showing their density values for use in the histogram producing steps of FIG. 2;

FIG. 4 shows an exemplary histogram produced by the steps of FIG. 2 from a matrix of pixels similar to the matrix portion shown in FIG. 3;

The drawings are not necessarily to scale.

DETAILED DESCRIPTION

Figure 1:
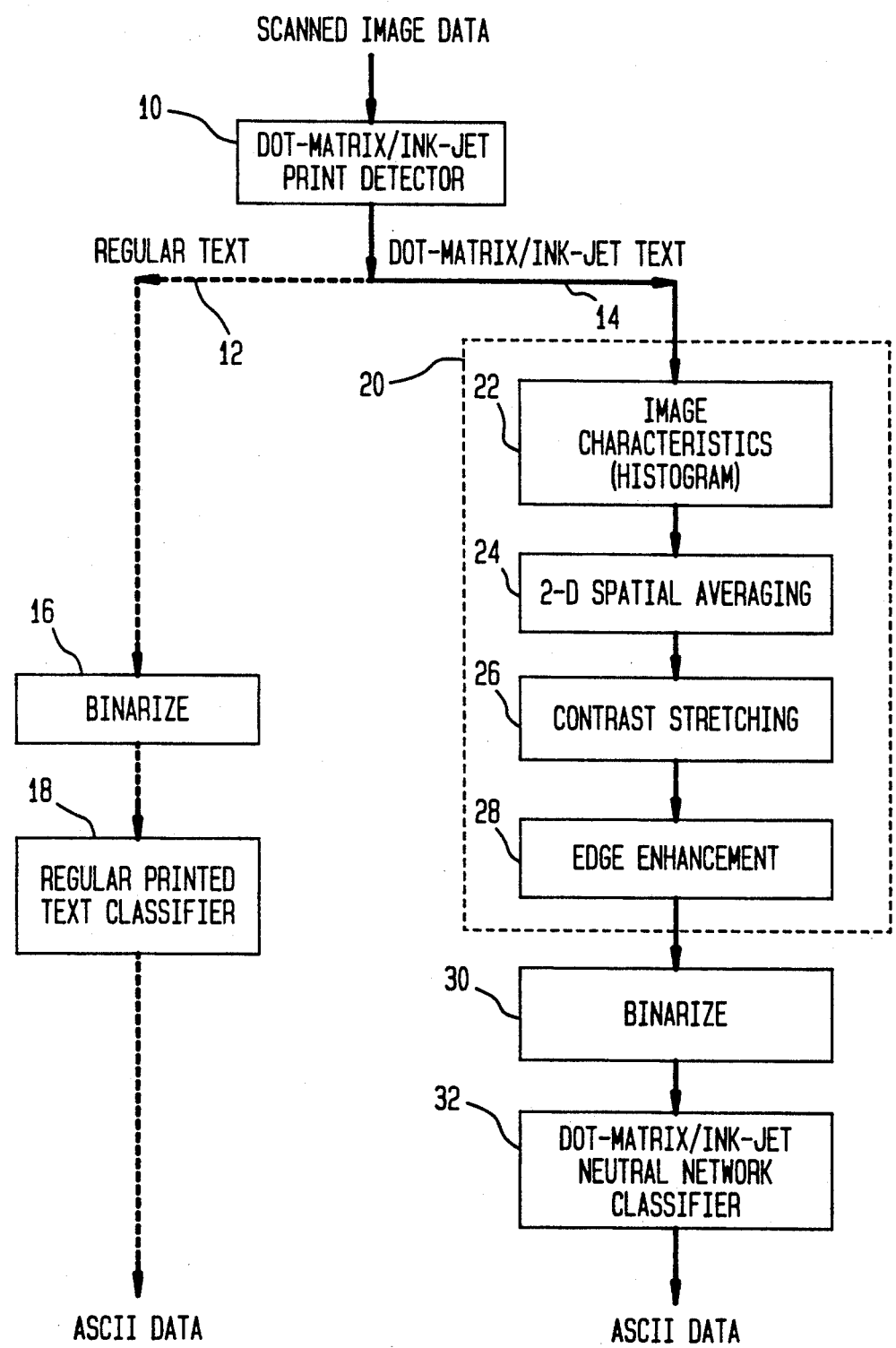
FIG. 1 shows a flowchart of steps for processing image data of printed text in accordance with the present invention including pre-processing steps for use with dot-matrix/ink-jet printed text.

Referring now to FIG. 1, there is shown a flowchart of steps used for processing image data of regular printed text and dot-matrix/ink-jet printed text in accordance with the present invention. In a first step designated by block 10, scanned image data of the printed text is received by a dot-matrix/ink-jet print detector. A print detector for recognizing dot-matrix or ink-jet printed text in the scanned image data can utilize any suitable technique as, for example, the method for detecting ink jet or dot matrix printing disclosed in U.S. patent application Ser. No. 764,415, (L. Barski et al.), filed on Sep. 23, 1991. In the disclosed technique, the text to be classified as a dot matrix or ink jet printer character is scanned at a suitable resolution. Several horizontal and vertical slices are made through a bitmap image of the individual characters. Density values of the pixels contained in these slices are stored as a density profile for each slice. As a result of these density profiles, a determination is made as to whether or not the characters were printed on a dot matrix or ink jet printer, or whether the characters were printed using a higher quality device such as a daisy wheel printer. The print detector used for the function of block 10 directs regular printed text down a first path 12 (designated by a dashed line), and dot-matrix or ink-jet printed text down a second path 14 (designated by a solid line).

The regular printed text detected by the print detector in block 10, and flowing down the first path 12, is processed using any suitable prior art technique. For example, the scanned image data of the regular printed text is first binarized as designated in block 16. The binarized data produced in a block 16 is then processed in a regular printed text classifier as designated in a block 18 using any suitable prior art regular printed text classifier program or circuitry. The resulting output signals from block 18 are in the form of ASCII data. The ASCII data is used for subsequent Optical Character Recognition (OCR).

The dot-matrix/ink-jet printed text detected by the print detector in block 10, and flowing down the second path 14, enters a pre-processing section 20 (shown within a dashed line rectangle) formed in accordance with the present invention. The pre-processing section 20 is based on the processing of grey-level dot-matrix/ink-jet print data, prior to binarization, and is considered as a pre-processing stage to a special classifier needed for Optical Character Recognition (OCR) of the dot-matrix and ink-jet print. More particularly, the pre-processing steps performed in accordance with the present invention in section 20 comprise a first step of calculating image characteristics as designated in a block 22 of section 20. Within block 22, a histogram of the image characteristics is performed using any well-known technique. For example, an 8-bit grey-level image is represented by an N-by-M matrix composed of NxM grey level pixels having density values (level of lightness or darkness) ranging from zero to 255. The histogram of the image data only preserves the exact number of pixels in the matrix for each density value, and not the spatial information. To generate the histogram, a vector of, for example, length 255 is defined, where each element of the abscissa of the histogram represents a separate density value of from zero to 255. For each pixel in the image, its density value is measured and the corresponding element in the histogram is increased by one. The function of block 22 is more easily understood from the following discussion of FIGS. 2, 3, and 4.

Referring now to FIGS. 2, 3, and 4, FIG. 2 shows a flowchart of steps for producing a histogram of an exemplary image (not shown), FIG. 3 shows a portion of an exemplary N-by-M matrix of pixels showing a measured density value for each pixel, and FIG. 4 shows an exemplary histogram produced by the steps of FIG. 2 from the exemplary density values in the matrix of FIG. 3. In a first step designated by block 40 in FIG. 2, a position [p(N,M)] value of a first pixel in the exemplary N-by-M matrix of FIG. 3 is read. In a second step designated by block 42 of FIG. 2, the density value (d) of the pixel [p(N,M)] position that was read in the first step in block 40 is measured. In a third step designated by block 44 of FIG. 2, the vector component (element) associated with the measured density value (d) is incremented by a count of one. The steps shown in blocks 40, 42, and 44 are then repeated for each of the other pixel positions of the N-by-M matrix of pixels of the original image. When all of the pixel of the N-by-M matrix have been processed by the steps of FIG. 2, a histogram as shown in FIG. 4 is produced. The histogram has increasing density values shown along the X-axis and increasing counts (numbers) shown along the Y-axis. The histogram shows that in the N-by-M matrix of pixels, there are two pixels with a density value of zero, five pixels with a density value of one, three pixels with a density value of two, sixteen pixels with a density value of three, twenty pixels with a density value of four, etc.

Figure 5:
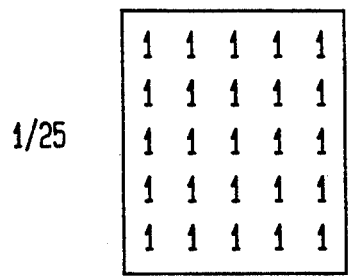
FIG. 5 shows an exemplary mask for use in performing 2-D spatial averaging in a second pre-processing step of FIG. 1.

Returning now to FIG. 1, a 2-D spatial averaging (smoothing) operation is performed as designated by a block 24 once the image characteristics are determined in the first pre-processing step of block 22. A 2-D spatial averaging (smoothing) operator alters the structure of the characters from that of dots to one of strokes by blurring or smearing the dots. The smoothing operation is accomplished by convolving, for example, a 5-by-5 spatial average mask with the image. A typical mask for the smoothing operation is shown in FIG. 5. As this mask is moved across the image, the pixel of the image that is overlaid with the central pixel of the mask is replaced with the average of 25 pixels that the mask overlays. This results in a smoothed image. The size of the mask that is used determines the amount of blurring, where a larger mask results in more smoothing. It is to be understood that very large dots, or dots with large spaces between the dots of the printed text, require large smoothing kernels. The 2-D spatial averaging operation functions to reduce the dynamic range of the data (the difference between the darkest and lightest pixel density). For a more detailed description of spatial averaging operation algorithms, see, for example, the book entitled *"Fundamentals of Digital Image Processing"* by Nail K. Jain, Prentice Hall, at pages 244 and 245.

Still referring to FIG. 1, subsequent to the 2-D spatial smoothing (averaging) operation, the image data is subjected to a contrast stretching operation as designated in a block 26 to compensate for the reduced dynamic range of the data. The contrast stretching operation functions to make dark regions of the image darker and lighten the lighter regions of the image. If the contrast stretching operation is applied to the image data before the 2-D smoothing operation of block 24, its benefits are reduced by the 2-D smoothing operation. Parameters used in the contrast stretching algorithm are determined from the original image histogram produced in block 22 (shown in FIG. 4). For a more detailed description of a contrast stretching operation see, for example, the book entitled *"Fundamentals of Digital Image Processing"*, by Nail K. Jain, Prentice Hall, at page 235. The function of block 26 is more easily understood from the following discussion of FIGS. 6 and 7.

Figure 6:
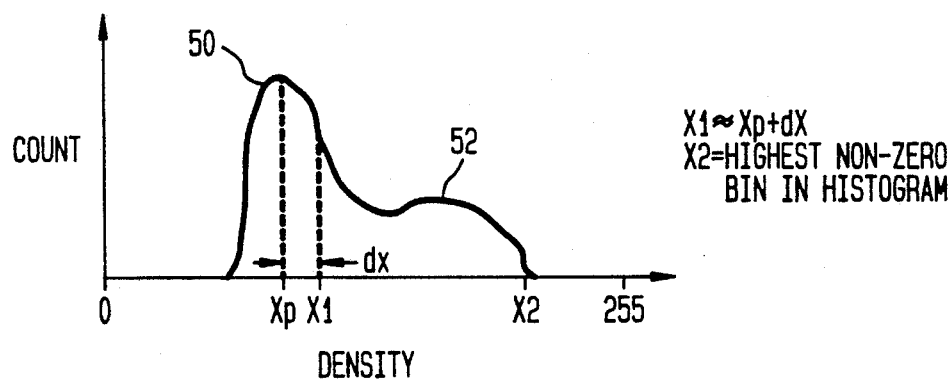
FIG. 6 shows a graph of a curve of an exemplary original histogram for determining parameters as shown for utilization in a contrast stretching operating of a third pre-processing step of FIG. 1.
Figure 7:
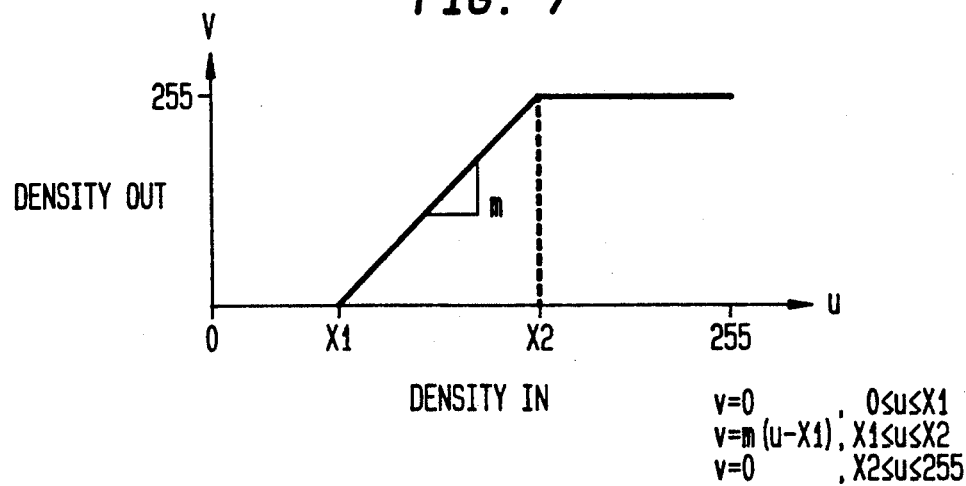
FIG. 7 shows a graph of a curve and certain parameters for performing contrast stretching in the third pre-processing step of FIG. 1.

Referring now to FIGS. 6 and 7, FIG. 6 shows a graph of a curve of an exemplary original histogram for determining the necessary parameters utilized in the contrast stretching operation with the Y-axis being an increasing count (number) and the X-axis being increasing density values. FIG. 7 shows a graph of a curve of an exemplary contrast stretching transformation based on the histogram of FIG. 6 with the X-axis indicating increasing input density values and the Y-axis indicating increasing output density values. In the histogram of FIG. 6, a first peak 50 of the curve is typically found that is higher in count than that of a second peak 52. The first peak 50 corresponds to the background density of the original document since there generally are more lighter pixels representing the background areas in a document than darker pixels represented by the characters of the printed text. The second peak 52, which may not be well defined, corresponds to the foreground density or the density of the characters or other printed symbols. The parameters of X1, X2, dX, u, and m shown in FIGS. 6 and 7 relate to the first and second peaks 50 and 52.

More particularly, the parameter X1 is a density value which is greater than the first peak value, Xp, by a shift value called delta X (dX). Typically, dX is determined empirically based upon the nature of the documents being processed. An exemplary value for dX for the contrast stretching operation of the present invention is the number "two". The parameter X2 corresponds to the right-most element of the histogram which is non-zero. The range from X1 to X2 is where the contrast stretching operation is performed. As shown in FIG. 7, "u" denotes pixel values before contract stretching is applied, and "v" denotes the pixel values after contrast stretching is performed. All pixel values between 0 and X1 are mapped to zero, and all pixel values between X2 and 255 are mapped to 255 (representing the maximum exemplary density value measurable). Pixel values between X1 and X2 are modified based upon the linear relationship of $255/(X2-X1)(u-X1)$. What is effectively accomplished is that pixel values outside the range of interest (X1 to X2) are forced to their respective boundary (0 or 255). Thus pixels less than X1 (0 to X1) are set to the same pixel level as the background, and pixels greater than X2 (X2 to 255) are set to the same pixel density as the foreground. Pixels of a density between X1 and X2 are remapped to cover the entire range (0-255) rather than their limited range of less than 0-255. Thus, the dynamic range of the image is expanded. At this point in the pre-processing operation, the individual dots of the characters have been smoothed into lines, and the dynamic range of the image has been expanded.

Returning now to FIG. 1, after the contrast stretching operation is performed, an edge enhancement operation is performed as shown in a block 28. It is to be understood that if the edge enhancement operation were employed before performing the contrast stretching step of block 26, then edge enhancement is not as effective because of the reduced dynamic range of the image produced by 2-D spatial averaging step. Additionally, if edge enhancement were employed before the 2-D spatial averaging step of block 24, the individual dots of the printed text are enhanced before being smoothed by the 2-D spatial averaging step, which is directly opposite of the objective of the present invention.

Figures 8, 9:
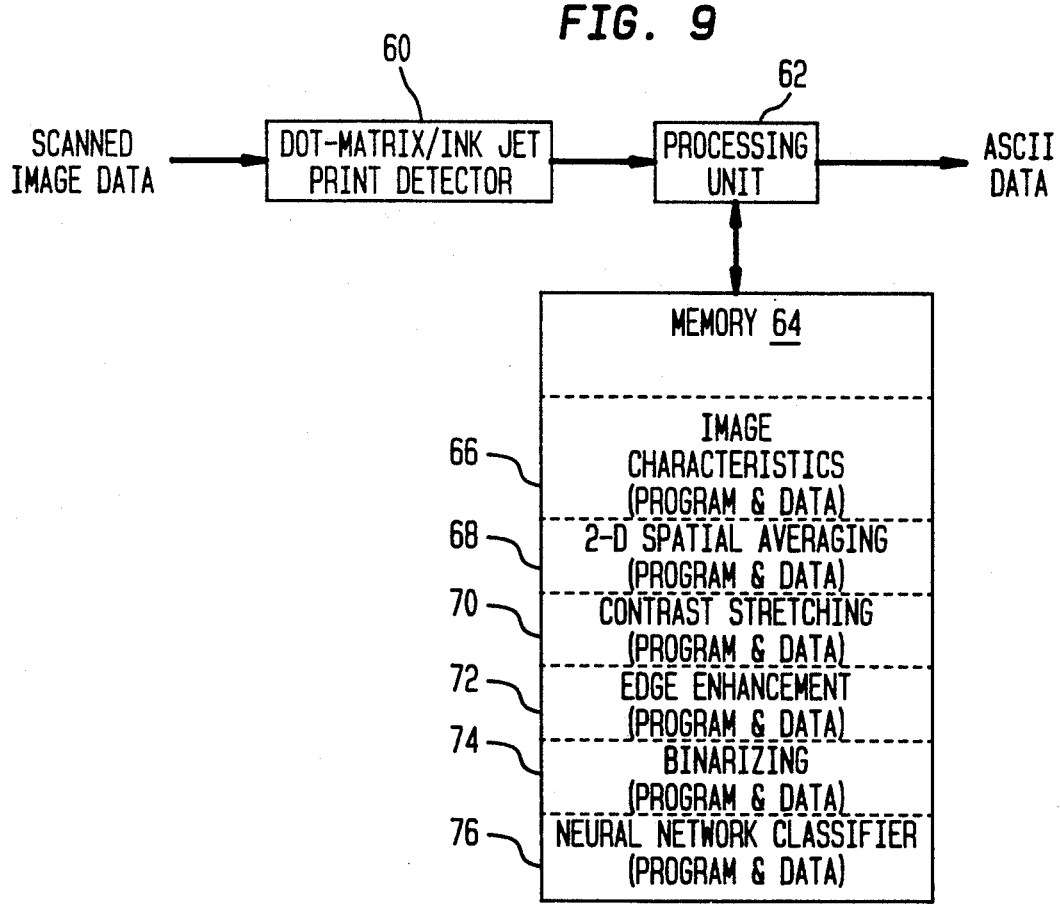
FIG. 8 shows an exemplary mask for use in performing edge enhancement in a fourth pre-processing step of FIG. 1.
FIG. 9 shows a block diagram of exemplary apparatus for practicing the processing of the dot-matrix/ink-jet printed text of FIG. 1.

Referring now to FIG. 8, there is shown an exemplary mask for performing edge enhancement of block 28 of FIG. 1. The function of the edge enhancement operation is to bring out the higher frequency line detail (no longer dots). For edge enhancement, the mask of FIG. 8 is moved across the image and is used to reduce the image to display only the edge information of the characters of the pre-processed dot-matrix/ink-jet printed text as is well known by those of ordinary skill in the art. In this regard see, for example, U.S. Pat. No. 4,074,231 (S. Yajima et al.), issued on Feb. 14, 1978, which discloses a mask used for edge enhancement in a pattern processing system. It is to be understood that any suitable edge enhancement technique can be used other than that of using a mask. For a detailed description of edge detection/enhancement see, for example, the book entitled *"Digital Image Processing-A Practical Primer"* by Gregory A. Baxes, Prentice Hall, at pages 52–56.

Returning now to FIG. 1, once the grey level pre-processing steps of section 20 are completed, binarization of the resultant pre-processed data is performed as designated in a block 30 which is labeled "BINARIZE". It is to be understood that the binarization operation can be accomplished by any suitable means. For example, binarization can be accomplished by generating a histogram of the density values of the modified image from the pre-processing steps of blocks 22, 24, 26, and 28. From such histogram, a threshold density value is determined, such as a midpoint density value. Then, every pixel with a density value equal to or above the threshold density value is set to 255 (a binary one), and every pixel with a density value below the threshold density value is set to zero (a binary zero).

After binarization, the binarized data is processed in a dot-matrix/ink-jet OCR neural network classifier as designated in a block 32 which is labeled "DOT-MATRIX/INK-JET NEURAL NETWORK CLASSIFIER". The OCR neural network classifier is based upon a backward error propagation paradigm and is of the same type as is disclosed in U.S. Pat. No. 5,048,097 (R. S. Gaborski et al.), issued on Sep. 10, 1991, which is incorporated herein by reference. The neural network classifier is trained (preconditioned) to recognize a predetermined set of symbols which are found in the image data of the printed matter. The output from the neural network classifier operation is ASCII data which is the processed by, for example, a post-processor (not shown) for OCR.

Referring now to FIG. 9, there is shown a block diagram of apparatus in accordance with the present invention for processing the dot-matrix/ink-jet printed text as shown in FIG. 1. The apparatus comprises a dot-matrix/ink-jet print detector 60, a processing unit 62 comprising a central processor unit or microcomputer, and a memory 64 associated with the processing unit 62. Scanned image data is received in the dot-matrix/ink-jet print detector 60 which determines whether the scanned image data includes dot-matrix or ink-jet printed text or not. The dot-matrix or ink-jet printed image data is delivered to the processing unit 62. The processing unit 62 uses the programs and data stored in the memory 64 to initially pre-process such image data as described hereinbefore. The memory 64 comprises an image characteristics program and data section 66, a 2-D spatial averaging program and data section 68, a contrast stretching program and data section 70, an edge enhancement program and data section 72, a binarization (binarizing) program and data section 74, and a dot-matrix/ink-jet neural network classifier 76. Each of the program and data sections 66, 68, 70, 72, 74 and 76 are shown within a separate dashed-line section of the memory 64. More particularly, the processing unit 62 performs the first pre-processing step of FIG. 1 on the received dot-matrix/ink-jet image data by accessing the image characteristics program and data section 66 of memory 64. With the image characteristic program, the processing unit 62 produces a histogram of the received image data as shown in FIGS. 2–4. Once the histogram is produced and stored in the memory 64, the processing unit 62 accesses the 2-D spatial averaging program and data section 68 of the memory 64. While accessing section 68, the processing unit 62 performs the smoothing operation on the print characters and reduces the dynamic range of the image data using, for example, the exemplary 5-by-5 mask of FIG. 5. The processing unit 62 then accesses the contrast stretching program and data section 70 in memory 64 for making the dark foreground regions of the characters darker and the lighter background regions lighter in the manner described for FIGS. 6 and 7. The processing unit 62 then accesses the edge enhancement program and data section 72 in the memory 64 for bringing out the high frequency detail of the characters using, for example, the exemplary mask shown in FIG. 8.

Having completed the pre-processing steps shown in blocks 22, 24, 26, and 28 of FIG. 1, the processing unit 62 binarizes the pre-processed dot-matrix/ink-jet print data (produced using the program and data of the edge enhancement section 70) by accessing the binarizing program and data section 74 of memory 64 Once the pre-processed image data is binarized, the processing unit 62 accesses the neural network classifier program and data section 76 of the memory 64 for recognizing the characters from a predetermined set of symbols expected in the original printed text. The resultant recognized symbols are ASCII data which is supplied to, for example, a post-processor (not shown) for performing Optical Character Recognition (OCR).

Figure 10:
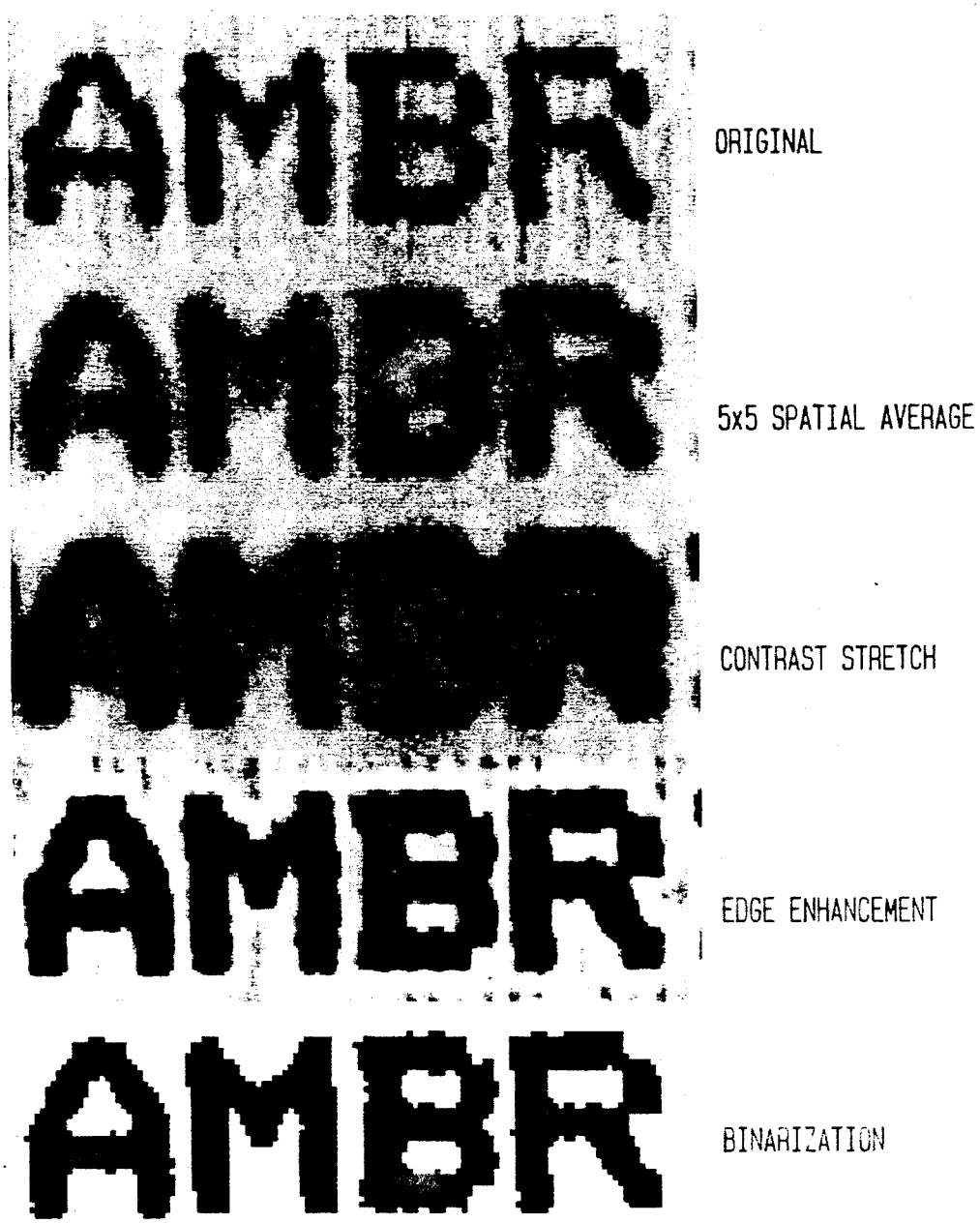
FIG. 10 shows sequential results of the pre-processing and the binarization steps of FIG. 1 on an exemplary group of four dot-matrix/ink-jet characters.

Referring now to FIG. 10, there is shown exemplary results of the pre-processing and binarization steps of FIG. 1 on an exemplary group of four dot-matrix/ink-jet characters. More particularly, the group of four dot-matrix or ink-jet produced characters (AMBR) shown in the top portion of FIG. 10 and labeled as "ORIGINAL", illustrate an exemplary group of characters in the received image data. At the conclusion of the 2-D spatial averaging (smoothing) step (shown in block 24 of FIG. 1), these same four characters appear as shown in the second from the top group of four characters in FIG. 10 and labeled "5×5 SPATIAL AVERAGE". After contrast stretching is performed on these four characters in block 26 of FIG. 1, the characters will appear as shown in the middle group of four characters of FIG. 10 labeled "CONTRAST STRETCH". The subsequent edge enhancement step performed in block 28 of FIG. 1 produces the characters as shown in the next to last group of four characters of FIG. 10 labeled "EDGE ENHANCEMENT". Finally, when the edge-enhanced characters are binarized as shown in block 30 of FIG. 1, the characters will appear as shown in the bottom (last) group of four characters shown in FIG. 10 and labeled "BINARIZATION".

It is to be appreciated and understood that the specific embodiments of the invention described hereinabove are merely illustrative of the general principles of the invention. Various modifications may be made by those of ordinary skill in the art which are consistent with the principles set forth. For example, certain sections of the memory 64 of FIG. 9 can be performed by transferring the appropriate data from the processing unit 62 to a separate circuit for processing. One such section is the binarizing section 74 of the memory 64 in FIG. 10. More particularly, the binarizing step can be performed in a circuit such as a comparator which outputs a binary "0" when the density level of a pixel is below a predetermined threshold value, and a binary "1" when the density level of a pixel is equal to or greater than the predetermined threshold value.

What is claimed is:

1. A method of processing image data of dot-matrix-ink-jet printed text for Optical Character Recognition (OCR) comprising the steps of:
   (a) determining the image characteristics of the dot-matrix/ink-jet image data by forming a histogram of density values of pixels of the image data;
   (b) reducing a dynamic range of the image data by altering the structure of characters in the image data from that of dots to one of strokes using a 2-D spatial averaging operation;
   (c) performing a contrast stretching operation on the altered structure of the characters produced in step (b);
   (d) performing edge enhancement of the characters of the image data produced in step (c); and
   (e) binarizing the edge enhanced image data of step (d).

2. The method of claim 1 further comprising the steps of:
   (f) prior to performing step (a), detecting if dot-matrix or ink-jet printed text is present in the image data; and
   (g) sending all dot-matrix or ink-jet printed image data for processing by steps (a) to (e).

3. The method of claim 1 further comprising the step of:
   (f) processing the binarized image data of step (e) in a neural network classifier for recognizing characters in the image data from a predetermined set of symbols for subsequent OCR.

4. The method of claim 1 wherein in performing step (b), performing the substeps of:
   (b1) moving a predetermined NxN mask pixel-by-pixel across the image data, where N is an odd integer greater than 1;
   (b2) calculating an average density value of the NxN pixels overlaid by the mask; and
   (b3) replacing the central pixel overlaid by the NxN mask with an average of the NxN pixels.

5. A method of processing image data of dot-matrix-ink-jet printed text for Optical Character Recognition (OCR) comprising the sequential steps of:
   (a) detecting whether dot-matrix or ink-jet printed text is present in the image data;
   (b) determining the image characteristics of the dot-matrix/ink-jet image data detected in step (a) by forming a histogram of density values of pixels of the image data;
   (c) reducing a dynamic range of the image data by altering the structure of characters in the image data from that of dots to one of strokes using the histogram produced in step (b) and a 2-D spatial averaging operation;
   (d) performing a contrast stretching operation on the altered structure of the characters produced in step (c);
   (e) performing edge enhancement of the characters of the image data produced in step (d); and
   (f) binarizing the edge enhanced image data of step (e).

6. The method of claim 5 further comprising the step of:
   (g) processing the binarized image data of step (f) in a neural network classifier for recognizing characters in the binarized image data from a predetermined set of symbols for subsequent OCR.

7. The method of claim 5 wherein in performing step (c), performing the substeps of:
   (c1) moving a predetermined NxN mask pixel-by-pixel across the image data, where N is an odd integer greater than 1;
   (c2) calculating an average density value of the NxN pixels overlaid by the mask; and
   (c3) replacing the central pixel overlaid by the NxN mask with an average of the NxN pixels.

8. Apparatus for processing image data of dot-matrix-ink-jet printed text for Optical Character Recognition (OCR) comprising:
   pre-processing means for pre-processing the image data of the dot-matrix or ink-jet printed text comprising;
   (a) determining means for determining the image characteristics of the dot-matrix/ink-jet image data by forming a histogram of density values of pixels of the image data;
   (b) 2-D spatial averaging means for reducing the dynamic range of the image data by altering the structure of characters in the image data from that of dots to one of strokes;
   (c) contrast stretching means for performing a contrast stretching operation on the altered structure of the characters produced by the 2-D spatial averaging means; and
   (d) edge enhancement means for performing edge enhancement of the characters of the image data produced by the contrast stretching means; and
   binarizing means for binarizing the edge enhanced image data from the pre-processing means.

9. The apparatus of claim 8 further comprising print detection means for detecting whether dot-matrix or ink-jet printed text is present in the image data and sending the image data to the determining means if the image data contains dot-matrix/ink-jet printed text.

10. The apparatus of claim 8 further comprising a neural network classifier for receiving the binarized image data from the binarizing means for recognizing characters in the binarized image data from a predetermined set of symbols for subsequent OCR.

11. The apparatus of claim 8 wherein the 2-D spatial averaging means comprises means for (a) moving a predetermined NxN mask pixel-by-pixel across the image data, where N is an odd integer greater than 1, (b) calculating an average density value of the NxN pixels overlaid by the mask, and (c) replacing the central pixel overlaid by the NxN mask with an average of the NxN pixels.

12. The apparatus of claim 8 wherein the pre-processing means is a central processor or microcomputer comprising:
   a processing unit; and
   a memory comprising memory locations for storing programs and data for permitting the processing unit to perform image characteristics calculations, 2-D spatial averaging, contrast stretching, and edge enhancement on the dot-matrix/ink-jet image data.

* * * * *